3,684,707
Patented Aug. 15, 1972

3,684,707
SLURRY FOR ABLATIVE WATER SYSTEMS COMPRISING A CROSS-LINKED POLYMER GELLING AGENT AND A TIME DELAY CARRIER
William L. Livingston, 283 Norwood St.,
Sharon, Mass. 02067
No Drawing. Filed May 19, 1970, Ser. No. 38,864
Int. Cl. A62d 1/00; B01j 13/00
U.S. Cl. 252—2    9 Claims

ABSTRACT OF THE DISCLOSURE

Preparation of ablative water for application in automatic sprinkler systems is facilitated when using solid, particulate gelling agents by storing a slurry of the gelling agent in a carrier liquid for subsequent mixing with water when the formation of an ablative water system is required to combat fire. The uniform admixture of gelling agent with water to provide ablative water consisting of a uniform gel is implemented by the use of a slurry comprising a particular carrier.

BACKGROUND OF THE INVENTION

This invention is directed to the field of combatting fires utilizing ablative fluid material systems.

An ablative material is comprehended within the present invention as a material which, when present in a layer of sufficient thickness, will permit thermal energy to be transmitted through its exposed outer surface, but not completely through said layer, said thermal energy being absorbed within said layer so as to immediately transform the material of said layer into vapor without internal convection of said material, said vapor leaving said layer through its outer surface.

The use of an ablative fluid material to combat a fire in a building or other confined location by the application of said material from an automatically operable fixed source such as an automatic sprinkler system is described in commonly assigned patent application of Livingston et al. Ser. No. 766,475, now Pat. No. 3,605,900, filed Oct. 10, 1968

As described in the aforementioned Livingston et al. application, water is converted to an ablative fluid material by the admixture therewith of a water-swellable cross-linked polymer. The formed ablative fluid material is in the form of a gel and is denoted "ablative water."

Water-swellable cross-linked polymers useful as gelling agents to convert water to ablative water are described in Katzer Pat. 3,354,084 and in Bashaw et al. Pat. 3,229,769. One useful water-swellable cross-linked polymer is sold by B. F. Goodrich Chemical Co. under the designation "Carbopol–960." Another useful water-swellable cross-linked polymer is sold by Dow Chemical under the designation "Gelgard M." Gelgard M is described in my copending application Ser. No. 13,179 filed Feb. 20, 1970 entitled "Slurry Additive for Ablative Water Fire Extinguishing Systems."

These water-swellable cross-linked polymers usually are available in solid, particulate form. In such form they present a problem when ablative water is to be produced on demand, as is desirable in an automatic sprinkler system utilizing ablative water. Production on demand is desirable because it is not feasible to premix and store sufficient quantities of ablative water to meet the maximum anticipated requirements in the event of a fire.

The aforementioned problem is an admixing problem. In particular, the problem is how the solid particulate polymer can be continually admixed with water on demand to continuously form ablative water.

To solve this problem it has been found desirable to slurry the solid, particulate water-swellable cross-linked polymers in a liquid carrier and to store the slurry in a holding tank connected to an automatic sprinkler system such that when the production of ablative water is required, the slurry can be introduced into the water flowing through the sprinkler system to prepare the ablative water on demand for delivery to the fire.

One problem involved in the utilization of such slurries is that they have a tendency to settle during long periods of storage, such that when required for introduction into the automatic sprinkler system, the water-swellable cross-linked polymer is unevenly introduced into the sprinkler system. My copending application Ser. No. 13,179 filed Feb. 20, 1970, entitled "Slurry Additive for Ablative Water Fire Extinguishing Systems" and my copending application Ser. No. 30,845 filed Apr. 22, 1970 entitled "Preparation of Ablative Water" are addressed to solutions for this settling problem.

There is another introduction problem associated with such slurries. If the carrier in the slurry is too readily washed away or otherwise removed from the gelling agent, the gelling agent can contact the water into which the slurry is injected before said slurry is uniformly dispersed through said water, resulting in thick, plastic-like globs dispersed in water. These globs have a consistency like licorice, and are coherent and do not break up. A suspension of such globs in water is not ablative water and does not perform the function of ablative water of efficiently extinguishing fires. On the other hand, if the carrier in the slurry does not permit the water to contact the gelling agent in the slurry prior to the time that the water is applied to a fire, ablative water is not produced. The present invention is addressed to the problem of providing a carrier for a slurry which provides proper shielding for the gelling agent so that ablative water is produced when the slurry is injected into water prior to the time when water is used for fire-fighting purposes.

SUMMARY OF THE INVENTION

In accordance with the present invention there is provided a slurry suitable for injection into ablative water fire extinguishing systems which slurry comprises a suspension of solid particulate water-swellable cross-linked polymer gelling agent in a liquid carrier, said carrier upon injection of the slurry into the water being effective to shield said gelling agent from contact with the water until the slurry is uniformly distributed through said water, but ineffective to prevent said contact from occurring prior to the use of the combination for fire extinguishing purposes. As a result, ablative water consisting of a uniform gel is produced for fire extinguishing purposes.

DETAILED DESCRIPTION OF THE INVENTION

Thus, in the invention herein the carrier serves the function not only of facilitating the handling of the gelling agent, but also of facilitating the dispersion of the gelling agent in water within certain time limits. Ordinarily, the carrier should shield the gelling agent from contact with the water for at least about 0.5 second after injection of the slurry into the water to insure that the gelling agent is uniformly distributed through the water so that the aforementioned thick, plastic-like globs of gelling agent are not formed, and so that ablative water consisting of a uniform gel is formed. Moreover, ordinarily the carrier should be such that it is washed-off or otherwise removed from the gelling agent in a time not exceeding about 4 seconds after injection of the slurry into said water, so that said uniform distribution of gelling agent in water occurs and ablative water is formed prior to the time that said water emits from the automatically operable fixed source through which it is applied and so that ablative water rather than plain water containing shielded gelling agent is applied to the fire protected by said automatically operable fixed source. Preferably, the carrier is such that it is washed-off or otherwise removed from said gelling agent to provide ablative water consisting of a uniform gel within a time period ranging from about 0.75 to about 3 seconds after the slurry containing the carrier and gelling agent is injected into water.

In addition to having adhering and solubility properties such that it provides shielding action to effect the aforedescribed uniform dispersion of gelling agent in water prior to the time that the water is applied to a fire, the carrier also should be inert to the gelling agent. Furthermore, it is essential that the carrier be such that it does not destroy the gel structure of ablative water. Thus it is essential that the carrier be composed of a material which is not ionic, since ionic materials destroy the gel structure of ablative water. Preferably, the carrier is non-corrosive and otherwise non-reactive with the materials utilized for handling the slurry.

Suitable carriers for use herein include, for example, polyhydric alcohol such as glycerine and sorbitol; halogenated hydrocarbons such as tetrabromoethane and carbon tetrachloride; silicone fluids; freons; and nonionic detergents such as polyethylene oxide condensates of alkylphenols wherein the alkyl group contains from 8 to 15 carbon atoms and the ethylene oxide is present in a molar ratio of ethylene oxide to alkyl phenol in the range of 8:1 to 20:1 such as, for example, polyethylene oxide condensates sold under the trade names "Tergitol" and "Triton N–101."

Preferred carriers are polyoxyalkylene compounds which are polyoxyalkylene monohydroxy compounds. These carriers are aliphatic monoethers of polyoxyalkylene glycols. The aliphatic monoether groups contain 1–4 carbon atoms. The polyoxyalkylene portion of the molecule comprises a chain formed predominantly of the oxyethylene group and the oxy-1,2-propylene group. They are prepared utilizing a mixture of ethylene oxide and 1,2-propylene oxide in which the weight ratio of ethylene oxide to 1,2-propylene oxide ranges from 3:1 to 1:1.5, preferably 2:1 to 1:1.25. Useful compounds have viscosities ranging from 50 to 150 Saybolt seconds at 100° F. and are water-miscible. These compounds are described in Roberts et al. U.S. 2,425,755. These compounds are readily commercially available. And especially useful compound of this class is sold under the tradename "UCON 50 HB 100." This compound is believed to have its aliphatic monoether group derived from butanol (that is, containing 4 carbon atoms) and to be prepared utilizing a mixture of ethylene oxide and 1,2-propylene oxide with a weight ratio of ethylene oxide to 1,2-propylene oxide of 1:1; it has a viscosity of 100 Saybolt seconds at 100° F. and is water-miscible. In addition to providing gelling agent contact within the aforementioned time period and being inert to the gelling agent and nonionic in character so that it does not destroy the gel structure, these preferred carriers are non-corrosive and otherwise non-reactive with the equipment in the system. In addition, these preferred carriers have a consistency which is not affected by temperature, and thus remain effective at temperatures normally encountered during slurry storage.

The carriers herein are ordinarily utilized so as to amount to from about 40% to about 90% by weight of the slurry, preferably from about 50% to about 65% by weight of the slurry. The remainder of the slurry comprises gelling agent as described hereinbefore.

The slurries in which the carriers of the present invention are utilized can be stable suspension or unstable suspensions. Preferably they are stable suspensions and contain stabilizer in accord with the inventions of my copending patent applications previously referred to. A preferred stabilizer is colloidal, pyrogenic silica, which is conveniently prepared by high temperature, that is, vapor-phase hydrolysis, of silicon tetrachloride. Ordinarily, said silica has a surface area ranging from 100 square meters per gram to 300 square meters per gram, preferably ranging from 175 square meters per gram to 225 square meters per gram. A very preferred pyrogenic silica is sold under the tradename Cab-O-Sil M–5; it has a surface area of 200 square meters per gram. If a stabilizer is not utilized, the slurry should be mixed just previous to its injection into water so that it is a uniform suspension of gelling agent in carrier.

The following example further illustrates the use of a carrier within the scope of the present invention.

Example

A 100-pound batch of slurry was made up as follows: 57 lbs. of UCON 50 HB 100 was poured into a cement mixer. To the UCON 50 HB 100 in the cement mixer was added over a three-minute period 3 lbs. of Cab-O-Sil M–5. The Cab-O-Sil was blended in slowly so that no lumps were formed. After the Cab-O-Sil was uniformly distributed through the UCON 50 HB 100, 40 lbs. of Gelgard M[1] was slowly blended in over a thirty-minute period. After the blending was achieved the mixing was stopped and a uniform slurry was provided. The slurry thus formed contained by weight 57% of UCON 50 HB 100, 40% Gelgard-M, and 3% Cab-O-Sil M–5.

The slurry thus formed was injected from a one-half inch diameter copper tube into the center of a water stream flowing in a three-inch diameter steel pipe by means of a Moyno positive displacement slurry pump to form an ablative material which was directed on a 12-foot high pile of ignited pallets by a spray nozzle centrally positioned above the top of the pile of pallets. Slurry was injected into the water stream so that the density of the ablative material directed onto the blazing pile of pallets was approximately 0.2 gallon/minutes/foot square. The amount of slurry added to the water was about 0.5% by weight, and since the Gelgard M represented about 40% of the slurry, the amount of gelling agent actually added to the water was about 0.2% by weight. A square spray pattern was obtained by using a solid pattern square nozzle manufactured by the Spray Systems Company under No. 2H290SQ. The ablative material extinguished the fire.

The carrier material, that is, the UCON 50 HB 100, delayed the gelling agent, that is the Gelgard M, from contacting the water into which the slurry was injected for one second. By this time the slurry was uniformly dispersed through the water. As a result there was formed ablative water consisting of a uniform gel. The ablative water was formed prior to the time it emerged from the nozzle referred to above so that ablative material was applied to the fire within the scope of the invention.

Shielding results equivalent to those described above are also achieved if the Cab-O-Sil stabilizer is left out of the slurry and the slurry is subjected to high shear mixing just previous to its injection into the water stream.

The invention may be embodied in other specific forms without departing from the spirit or the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A slurry suitable for injection into ablative water fixed fire extinguishing systems, said slurry comprising a suspension of solid particulate water-swellable cross-linked ---
[1] The Gelgard had a particle size of through 325 mesh, U.S. Standard Sieve Series.

polymer gelling agent in a liquid carrier inert to said gelling agent, said carrier upon injection of the slurry into water being effective to shield said gelling agent from contact with the water until the slurry is uniformly distributed through said water, but ineffective to prevent said contact from occurring prior to the use of the combination of slurry and water for fire extinguishing purposes, whereby ablative water consisting of a uniform gel is produced for application to a fire.

2. A slurry as recited in claim 1 wherein said carrier shields the gelling agent from contact with water for a period ranging from about 0.5 second to about 4 seconds.

3. A slurry as recited in claim 2 wherein said time period ranges from about 0.75 second to about 3 seconds.

4. A slurry as recited in claim 1 wherein said carrier is a polyoxyalkylene monohydroxy compound.

5. A slurry as recited in claim 4 wherein the polyoxyalkylene carrier is a polyoxyalkylene monohydroxy compound which is an aliphatic monoether of a polyoxyalkylene glycol, the aliphatic monoether group containing 1 to 4 carbon atoms, the polyoxyalkylene portion of the molecule comprising a chain formed predominantly of the oxyethylene group and the oxy-1,2-propylene group.

6. A slurry as recited in claim 5 wherein the carrier is prepared utilizing a mixture of ethylene oxide and 1,2-propylene oxide in which the weight ratio of ethylene oxide to 1,2-propylene oxide ranges from about 3:1 to 1:1.5, said carrier having a viscosity ranging from about 50 to 150 Saybolt seconds at 100° F., said carrier being water-miscible.

7. A slurry as recited in claim 6 wherein the weight ratio of ethylene oxide to 1,2-propylene oxide ranges from about 2:1 to 1:1.25 and wherein said carrier has a viscosity ranging from about 75 to 125 Saybolt seconds at 100° F.

8. A slurry as recited in claim 1 wherein the carrier constituent amounts to from about 40% to about 90% by weight of the slurry.

9. A slurry as recited in claim 1 which is a stable suspension of gelling agent in carrier.

References Cited

UNITED STATES PATENTS

| | | | |
|---|---|---|---|
| 3,229,769 | 1/1966 | Bashaw et al. | 169—1 |
| 2,425,755 | 8/1947 | Roberts et al. | 260—615 B |
| 3,480,546 | 11/1969 | Bashaw et al. | 252—3 |
| 3,402,137 | 9/1968 | Fischer et al. | 252—363.5 |
| 3,345,289 | 10/1967 | Freifeld et al. | 252—8.1 |
| 3,247,171 | 4/1966 | Walker | 260—80.3 |
| 3,404,089 | 10/1968 | Holzinger | 252—2 |
| 3,354,084 | 11/1967 | Katzer | 252—2 |

FOREIGN PATENTS

| | | | |
|---|---|---|---|
| 1,223,701 | 8/1966 | Germany | 252—8.05 |

ROBERT F. BURNETT, Primary Examiner

D. J. FRITSCH, Assistant Examiner

U.S. Cl. X.R.

252—8.05, 316, 363.5

UNITED STATES PATENT OFFICE
CERTIFICATE OF CORRECTION

Patent No. 3,684,707          Dated August 15, 1972

Inventor(s) William L. Livingston

It is certified that error appears in the above-identified patent and that said Letters Patent are hereby corrected as shown below:

On the face of the patent the assignee should be listed as Factory Mutual Research Corporation, Norwood, Massachusetts.

Signed and Sealed this

Second Day of May 1978

[SEAL]

Attest:

RUTH C. MASON
Attesting Officer

LUTRELLE F. PARKER
Acting Commissioner of Patents and Trademarks